(12) United States Patent
Kawasaki (10) Patent No.: US 10,553,108 B2
(45) Date of Patent: Feb. 4, 2020

(54) NAVIGATION SERVER AND NAVIGATION SYSTEM

(71) Applicant: HONDA MOTOR CO., LTD., Tokyo (JP)

(72) Inventor: Shunsuke Kawasaki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/382,858

(22) Filed: Dec. 19, 2016

(65) Prior Publication Data

US 2017/0178502 A1 Jun. 22, 2017

(30) Foreign Application Priority Data

Dec. 22, 2015 (JP) .................. 2015-250671

(51) Int. Cl.
*G08G 1/01* (2006.01)
(52) U.S. Cl.
CPC .......... *G08G 1/0133* (2013.01); *G08G 1/0112* (2013.01); *G08G 1/0141* (2013.01)
(58) Field of Classification Search
CPC .................................................. G08G 1/01333
See application file for complete search history.

(56) References Cited

U.S. PATENT DOCUMENTS

| | | | |
|---|---|---|---|
| 2003/0033078 A1* | 2/2003 | Kita | G08G 1/096716 701/117 |
| 2006/0082472 A1* | 4/2006 | Adachi | G08G 1/096716 340/995.13 |
| 2006/0206256 A1* | 9/2006 | Kumagai | G08G 1/0104 701/117 |
| 2007/0088489 A1* | 4/2007 | Tsuge | G08G 1/0104 701/117 |

FOREIGN PATENT DOCUMENTS

| | | |
|---|---|---|
| JP | 2004-220574 A | 8/2004 |
| JP | 2005-316739 A | 11/2005 |
| JP | 2006-344006 A | 12/2006 |
| JP | 2014-137696 A | 7/2014 |
| WO | WO 2008/007663 A1 | 1/2008 |
| WO | WO 2008/010408 A1 | 1/2008 |
| WO | WO 2009/025359 A1 | 2/2009 |
| WO | WO 2014/103079 A1 | 7/2014 |

OTHER PUBLICATIONS

Japanese Office Action issued in corresponding Japanese Patent Application No. 2015-250671 dated Oct. 2, 2018.

* cited by examiner

*Primary Examiner* — Imran K Mustafa
(74) *Attorney, Agent, or Firm* — Squire Patton Boggs (US) LLP (57) ABSTRACT

Provided is a navigation server capable of improving reliability or estimation accuracy of traffic state information for a user in view of the present traffic state. A partial movement cost $C_{ik}$ being each of movement costs in plural partial links $L_{ik}$ constituting a designated link $L_i$ is used to determine a total movement cost $C_i$ in the designated link $L_i$. The higher an occupancy ratio $r$ of a first partial link $L_{im}$ among a series of the partial links $L_{ik}$, the more preferentially a partial movement cost $C_{im}$ in the first partial link $L_{im}$ is used than a partial movement cost $C_{in}$ in a second partial link $L_{in}$ to determine the total movement cost $C_i$ of the designated link $L_i$. In particular, only the partial movement cost $C_{im}$ in the first partial link $L_{im}$ is used to determine the total movement cost $C_i$ of the designated link $L_i$.

8 Claims, 5 Drawing Sheets

NAVIGATION SERVER AND NAVIGATION SYSTEM

BACKGROUND OF THE INVENTION

Field of Invention

The present invention relates to a navigation server with a function of communicating with a plurality of navigation clients serving as a mobile station and a system composed of the navigation server and the plurality of navigation clients.

Description of the Related Art

There has been proposed a technique for detecting a level of traffic jam depending on vehicle speeds from a vehicle speed, a prescribed speed, a movement history (set according to a level of traffic jam), a prescribed distance, and a combined determination distance (refer to Patent Literature 1: International Publication No. WO 2008/007663). Furthermore, there has been proposed a technique for determining a level of traffic jam by allocating traffic jam level information according to the maximum vehicle speed to a link in a starting-end reference-point distance predetermined from the starting point of the link, if a link length is within a predetermined range (refer to Patent Literature 2: International Publication No. WO 2009/025359). Still furthermore, there has been proposed a technique in which past and present traffic jam information at a prescribed place is obtained to grasp increase/decrease tendency of the traffic jam and notification is performed (refer to Patent Literature 3: International Publication No. WO 2008/010408). Still yet furthermore, there has been proposed a technique for displaying traffic jam information on a map of a display unit in a superimposed manner to grasp the spread of the whole traffic jam range (refer to Patent Literature 4: International Publication No. WO 2014/103079). Still yet furthermore, there has been proposed a technique in which a vehicle detector calculates traffic amount based on the number of vehicles in the upstream and downstream intervals to presume the number of vehicles in an interval (refer to Patent Literature 5: Japanese Patent Laid-Open No. 2014-137696)

In a mobile station, since traffic state is displayed or used as a unit of links, the traffic state displayed in the mobile station may deviate from an actual traffic state in such a case where, for example, traffic jam occurs in a part of the link but traffic is smooth in another part. Thus, as the link becomes longer, the tendency of the traffic state in a part of the link differing from another part may be stronger. As a result, reliability of the traffic state displayed in the mobile station may be compromised.

The problem to be solved by the present invention is to provide a navigation server capable of improving reliability or estimation accuracy of information about traffic state provided for a user in view of the present traffic state.

SUMMARY OF THE INVENTION

A navigation server of the present invention includes a server storage device; a first server computing element configured to recognize probe information including time series of positions of each of a plurality of navigation clients based on communication with each of the plurality of navigation clients serving as a mobile station and determine, as a partial movement cost, a movement cost in each of a series of partial links constituting one of or respective designated links among a plurality of links constituting a road network; and a second server computing element configured to determine a total movement cost of the designated link composed of the series partial links by preferentially using the partial movement cost in the partial link with high freshness rather than the partial movement cost in the partial link with low freshness, the freshness being defined based on the time elapsed since the first server computing element determined a last partial movement cost among the series of partial links, and store the total movement cost in the server storage device.

The navigation system of the present invention is characterized by including the navigation server of the present invention and the plurality of navigation clients.

According to the navigation server of the present invention and the navigation system with the navigation server as a component (hereinafter referred to as "navigation system and others"), a partial movement cost which is each movement cost in a plurality of partial links constituting the designated link is used to determine the total movement cost in the designated link. Since it is avoided that the partial movement cost with low freshness is excessively reflected in the total movement cost, the reliability of the total movement cost in the designated link is improved in view of the present traffic state in the designated link.

In the navigation server and others according to one embodiment of the present invention, the higher an occupancy ratio of a first partial link whose partial movement cost is equal to or more than a reference value in freshness among the series partial links, the more preferentially the second server computing element uses the partial movement cost in the first partial link than the partial movement cost in a second partial link having freshness less than the reference value, to determine the total movement cost of the designated link composed of the series of the partial links.

According to the present navigation server and others, the partial movement cost in the first partial link with relatively high freshness among a plurality of partial links constituting the designated link is more preferentially used than the partial movement cost in the second partial link with comparatively low freshness to improve the reliability of the total movement cost in the designated link.

In the navigation server and others according to one embodiment of the present invention, if the occupancy ratio of the first partial link in the series partial links is equal to or greater than a reference ratio, the second server computing element determines the total movement cost of the designated link by using only the partial movement cost in the first partial link.

According to the present navigation server and others, if the partial movement cost is of high freshness in a sufficient amount of partial links (the first partial link) in view of grasping the total traffic state in the designated link, the partial movement cost with comparatively low freshness in the other partial links (the second partial link) is not used to improve the reliability of the total movement cost in the designated link.

In the navigation server and others according to one embodiment of the present invention, in a case of the designated links including at least one of an inflow point from an inflow link and an outflow point into an outflow link, the freshness of the partial movement cost in the partial links on each of an upstream side and a downstream side of the inflow point and the outflow point has a deviation equal to or greater than a threshold, the second server computing element decreases the deviation of a preferential degree of the partial movement cost in the partial link on each of the upstream side and the downstream side of the inflow point or the outflow point.

If the freshness of the partial movement cost significantly deviates between the partial links constituting the designated link, which may be influenced by the inflow of the navigation client from the inflow link to the designated link or the outflow of the navigation client from the designated link into the outflow link. For this reason, as described above, the partial movement cost with high freshness is preferentially used to possibly deteriorate the reliability of the total movement cost of the designated link. However, according to the present navigation server and others, the deviation of the preferential degree of the partial movement cost in the partial link on each of the upstream and downstream sides at the inflow point or the outflow point is decreased. For this reason, the above-mentioned influence is reduced or wiped out to improve the reliability of the total movement cost in the designated link.

In the navigation server and others according to one embodiment of the present invention, the server storage device stores server map information in which a road network is represented by the plurality of links and the first server computing element uses the server map information to perform map matching on a position of the navigation client included in the prove information to identify the designated link where the navigation client has moved, and determine the partial movement cost in the designated link using the probe information.

According to the present navigation server and others, the estimation accuracy of the partial link through which the navigation client passes because of the map matching is improved. As a result, reliability of not only the partial movement cost in the partial link, but also the total movement cost in the designated link including the partial link is improved.

In the navigation server and others according to one embodiment of the present invention, the server storage device stores a reference movement cost generated separately from the total movement cost based on the probe information in each of the plurality of links, and the second server computing element determines the total movement cost in the designated link using not only the partial movement cost in at least one of partial links among the series of partial links but also the reference movement cost in the designated link composed of the series of partial links.

According to the present navigation server and others, not only the partial movement cost but also somewhat reliable reference movement cost is used to improve the reliability of the total movement cost in the designated link.

DETAILED DESCRIPTION OF THE PREFERRED EMBODIMENTS (Configuration of Navigation System)

Figure 1:
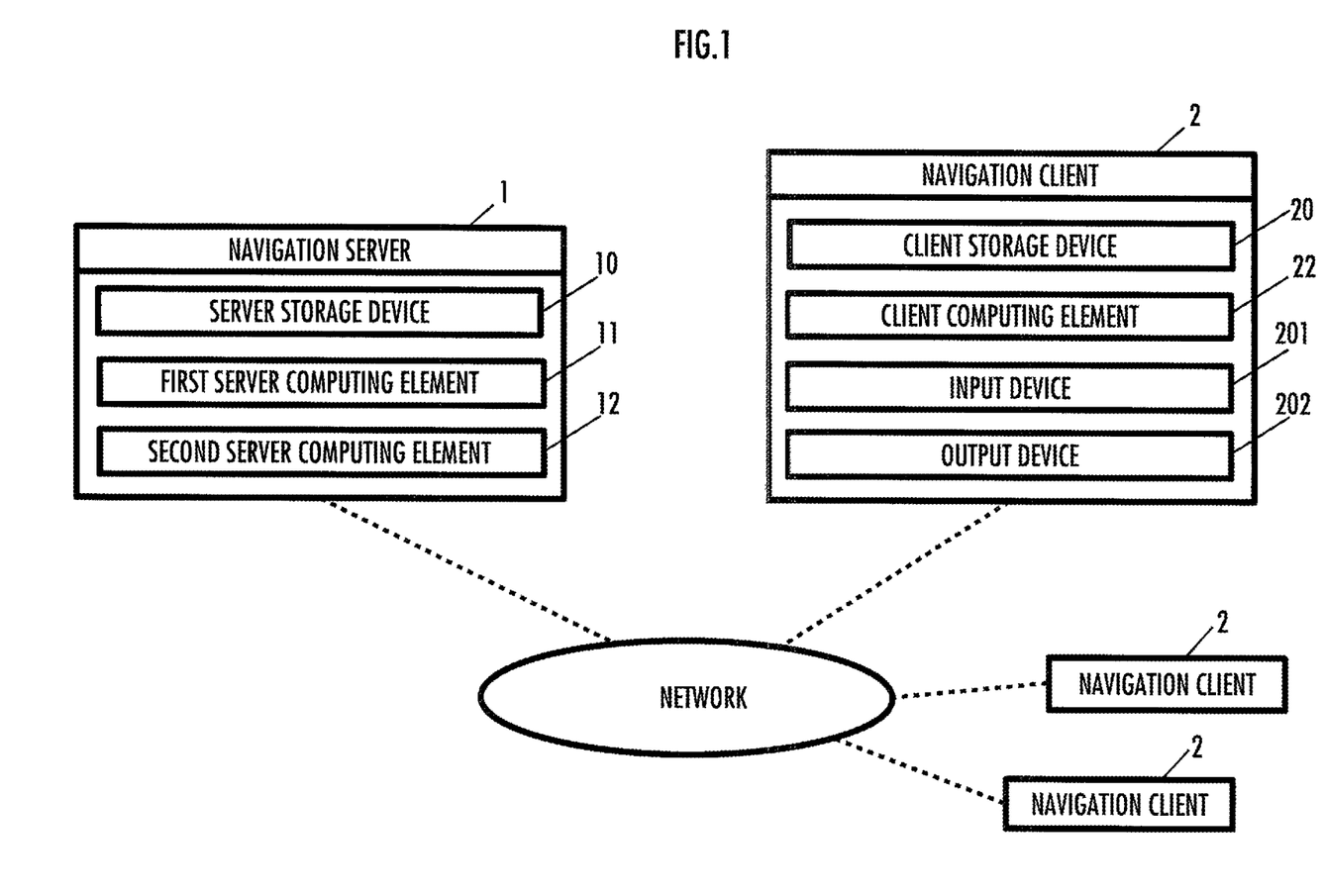
FIG. 1 is a schematic diagram of a navigation system according to one embodiment of the present invention.

The navigation system illustrated in FIG. 1 as one embodiment of the present invention includes a navigation server 1 and a plurality of navigation clients 2 being mobile stations. The navigation server 1 and each of the plurality of navigation clients 2 can communicate with each other via one or a plurality of networks. The navigation client 2 is temporarily or permanently loaded on a moving body being a device with a function of moving according to user's driving operation such as a vehicle, for example, a four-wheel automobile, a two-wheel automobile, and a bicycle. The navigation client 2 may be an information terminal carried by users.

(Configuration of Navigation Server)

The navigation server 1 is composed of a computer serving as a fixed station and includes a server storage device 10, a first server computing element 11, and a second server computing element 12. The navigation server 1 may be composed of a mobile terminal device such as a smart phone or a tablet serving as a mobile station.

The server storage device 10 is configured to store computing results such as reception information and calculation results obtained by each of the first server computing element 11 and the second server computing element 12. The server storage device 10 stores server map information and road traffic information.

The server map information includes data representing not only columns of coordinate values ((latitude, longitude) or (latitude, longitude, altitude) representing position, shape, and orientation of each of a plurality of links $L_j$ (i=1, 2, . . . , J) constituting a road network but also link identification information and attribute for identifying each link $L_j$. Each link $L_j$ is connected with other links at a node (one end or both ends). The server map information includes data representing not only columns of coordinate values representing position, shape, and orientation of each partial link $L_{ik}$ (k=1, 2, . . . , K) constituting one of or respective designated links $L_i$ (i is any integer of 1 to J) among a plurality of links $L_j$, but also partial link identification information and attribute for identifying each partial link $L_{ik}$. The road traffic information includes a total movement cost $C_j$ at each link $L_j$ determined, as described below later, based on probe information collected from the navigation client 2.

The first and second server computing elements 11 and 12 are composed of a computing device (central processing unit, CPU) which reads software and data, as required, from the designated area of the memory constituting the server storage device 10 and executes designated computing according to the software with the data targeted, a communication appliance, and a storage device (memory) as needed. The designated computing is described below later in detail.

(Configuration of Navigation Client)

The navigation client 2 is composed of a portable terminal device such as a smart phone or a tablet serving as a mobile station. "Portable" means that the size is almost equal to a standard palm of a human, for example, and the weight is light enough to carry the terminal device by one hand or with the device put in a pocket of clothes. The navigation client 2 may be composed of an appliance (an appliance incorporated into a moving body, for example) which is larger and heavier than a mobile device.

The navigation client 2 includes a client storage device 20 and a client computing element 22.

The client storage device 20 is configured to store computing results such as reception information and calculation results from the client computing element 22. The client storage device 20 is configured to store application software in addition to client map information and contents.

The client map information includes columns of coordinate representing position, shape, and orientation of each link constituting a road and link identification information for identifying each link. The client map information may not include columns of coordinate but may include image information for displaying the map on an output device 202 and the link identification information of each link constituting the roads included in the map. In this case, the link identification information or a road type corresponding to the coordinate values may be identified by the navigation server 1 such that the coordinate values corresponding to coordinate values included in probe information or request information among the coordinate values included in the server map information are identified. Although the definition of coordinate columns in each map information is different because specification and data structure are different between the client map information and the server map information, the link can be matched such that common link identification information is provided for the same link. The navigation server 1 transmits server route information including the link identification information and the navigation client 2 displays a navigation route image including a plurality of links identified by the link identification information included in the route information on the output device 202.

A content includes not only a content recognized through visual perception, like an image content (still picture and moving image), but also a content recognized through hearing sense, like acoustic content (musical composition, operation sound, and others) and amusement content produced by combining the above contents. The image content includes not only a part of the client map information, but also a client route displayed superimposed on the client map information.

The client computing element 22 is configured to measure or detect the present position of the navigation client 2 in a time-series manner. The present position of the navigation client 2 is measured based not only on the signal received from an artificial satellite by a global positioning system (GPS) receiver but also on the output signal of a gyro-sensor as required. The client computing element 22 is configured to transmit probe information representing a time-series change mode at a position of the navigation client 2 to the navigation server 1.

The client computing element 22 is configured to transmit "route search request" to the navigation server 1 and receive "server route information" in response to the request from the navigation server 1. The client computing element 22 is configured to search the client route by using the client map information based on the server route information and output the client route to the output device 202.

The navigation client 2 includes also an input device 201 and the output device 202. The input device 201 is composed of an operation button or a microphone and enables various operations or input setting by user's operations or speech production. The output device 202 is composed of a display device and an acoustic output device (loudspeaker) to display image contents such as the client map information or output an acoustic content. The input device 201 and the output device 202 may be composed of a touch-panel display.

The expression that the component of the present invention "outputs" information means that information is output in every possible form which a human can recognize through five senses such as visual sense, auditory sense, touch sense and others. The expression that the component of the present invention "is configured to" execute a computing task allocated to the component means that the component can function, and is programmed, to read required program and data from the memory and execute the allocated computing task according to the program based on the data.

(Functions)

The functions of the navigation system configured as stated above are described below. In an operation state (an IGN switch of a vehicle is turned on) of a moving body on which the navigation client 2 is loaded, the client computing element 22 periodically or intermittently measures the present position of the navigation client 2 (refer to STEP 21 in FIG. 2).

Figure 2:
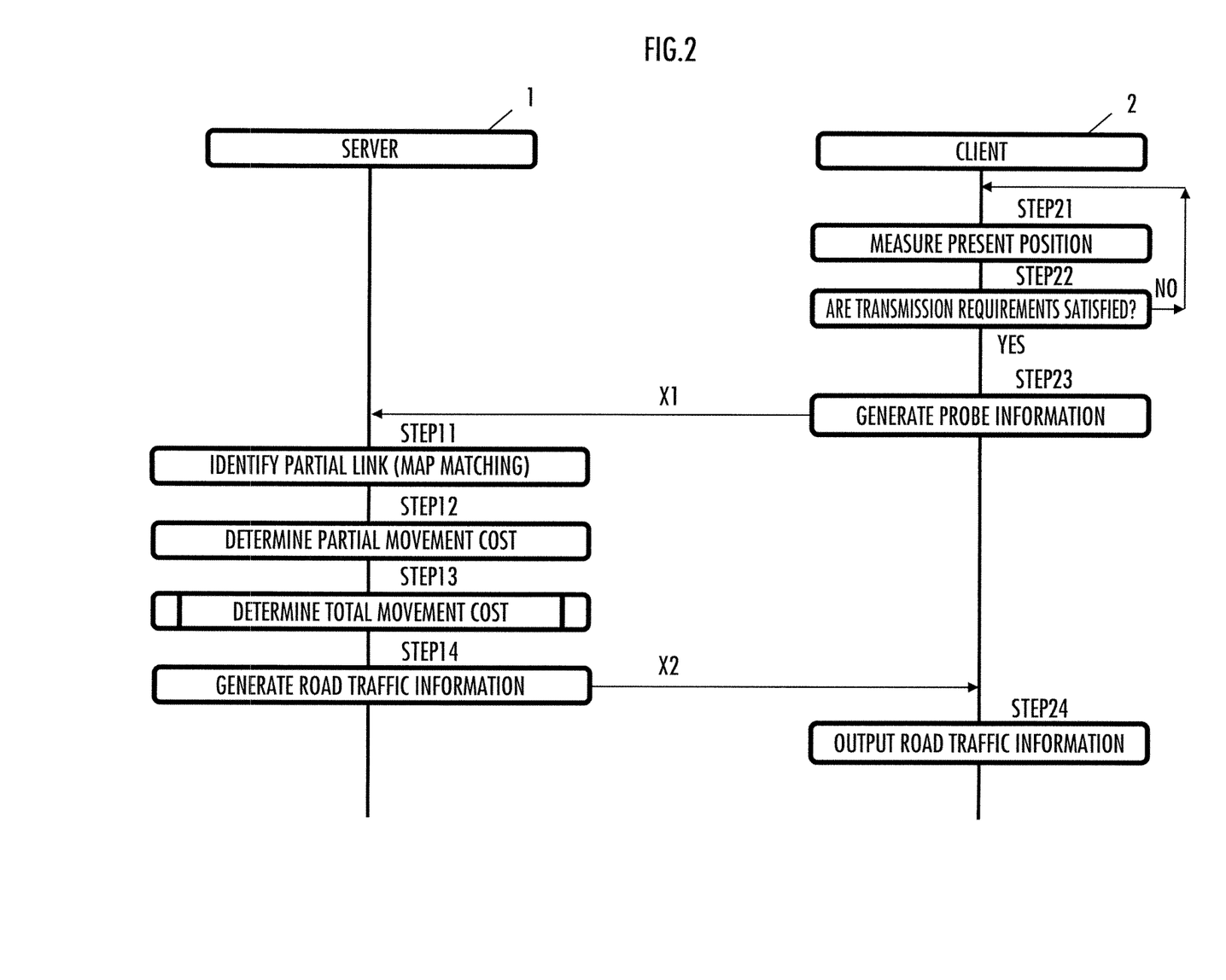
FIG. 2 is a drawing describing the function of the navigation system.

The client computing element 22 determines whether transmission requirements are satisfied, for example, whether a predetermined time has passed since the last prove information was transmitted or whether the time-series data amount of measurement results at the present position has reached a predetermined amount (refer to STEP 22 in FIG. 2). If the determination result is negative (NO, in STEP 22 in FIG. 2), the client computing element 22 continues to measure the present position of the navigation client 2 (STEP 21 in FIG. 2). On the other hand, if the determination result is positive (YES, in STEP 22 in FIG. 2), the client computing element 22 generates the probe information and transmits the information to the navigation server 1 via a communication appliance or a communication interface (STEP 23 and an arrow X1 in FIG. 2). The probe information includes time-series position of navigation client 2 at each time as data for calculating the movement cost Cik (for example, required movement time of the navigation client 2 in each link Lik or the moving body on which the navigation client 2 is loaded) of each partial link Lik.

In the navigation server 1, the first server computing element 11 receives the probe information via the communication appliance or the communication interface and identifies the partial link which the navigation client 2 identified by an identifier included in the prove information has passed (STEP 11 in FIG. 2). For example, a position where navigation client 2 lies in a certain time and which is included in the prove information, is subjected to map matching. For example, the partial link Lik represented by the column including the coordinate value which is the closest to the coordinate value representing a position where the navigation client 2 lies is identified as the partial link which the navigation client 2 has passed at the time. If the accuracy of position included in the prove information is high, map matching does not need to be executed.

The first server computing element 11 determines the movement cost at each partial link Lik as a partial movement cost Cik based on the prove information (STEP 12 in FIG. 2). The partial movement cost Cik is movement time required of the navigation client 2 in each partial link Lik, for example, or the moving body on which the navigation client 2 is loaded. The required movement time grasped from the time series of position included in the probe information is adopted as the partial movement cost Cik. If the time series of energy consumption (fuel consumption or power consumption) is included in the probe information, the energy consumption of the moving body on which the navigation client 2 in each partial link Lik is loaded may be adopted as the partial movement cost Cik. The partial movement cost Cik is stored in the server storage device 10 along with the time of last determination.

Figure 4:
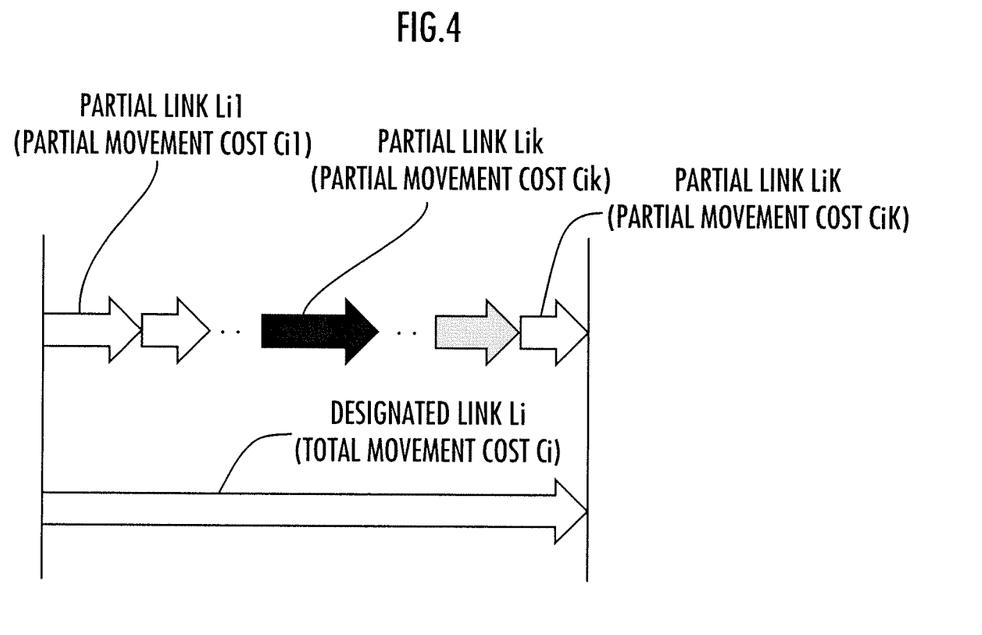
FIG. 4 is a drawing describing the relationship between partial movement cost and the total movement cost.

The second server computing element 12 determines the total movement cost Ci by using the partial movement cost Cik at the partial link Lik constituting the designated link Li, determined by the first server computing element 11 (STEP 13 in FIG. 2). FIG. 4 schematically shows a state where the partial movement cost Cik in at least one partial link Lik indicated by arrows connected in series on the upper side is used to determine the total movement cost Ci indicated by a single arrow on the lower side. This means that the lower the brightness, the higher the cost. Based on the probe information and in the same way as that for the partial movement cost Cik, the second server computing element 12 determines the movement cost Cj of each link Lj excluding the designated link Li (total movement cost).

The second server computing element 12 generates road traffic information about each link Lj including the designated link Li and transmits the information to navigation client 2 via the communication appliance or the communication interface (STEP 14 and arrow X2 in FIG. 2).

Route information for navigation may be generated as road traffic information. More specifically, a target position is set by a user in the navigation client 2 through the input device 201 according to the input method for outputting to the output device 202. According to the above, the client computing element 22 measures the latest present position of the navigation client 2 or reads the position from the client storage device 20. Thereafter, the client computing element 22 transmits a route search request including the present position (or a starting position) and the target position to the navigation server 1 automatically or according to user's instruction through the input device 201.

Road traffic information includes the movement cost Cj in each link Lj (for example, the movement time required of the navigation client 2 in each link Lj or the movement body on which the navigation client 2 is loaded).

The first server computing element 11 in the navigation server 1 searches one or a plurality of server routes R composed of a plurality of link groups connecting the starting position and the target position of the navigation client 2. The server route R is searched using the server map information, the total movement cost Ci in the designated link Li, and the movement cost Cj in other links Lj. The route that is the lowest in the total movement cost is searched as the server route R. The movement cost is a concept that includes at least one among the required movement time, movement distance, driving difficulties (the number of curves, the size of road width, and others), energy amount required for movement (fuel charge), and toll fare.

The first server computing element 11 generates the server route information representing the result of searching the server route R and transmits the server route information to the navigation client 2. The server route information includes link identification information of at least part of a link among a series of link groups constituting the server route R or each of coordinate values at a plurality of discrete points lying on the server route R.

Figure 5:
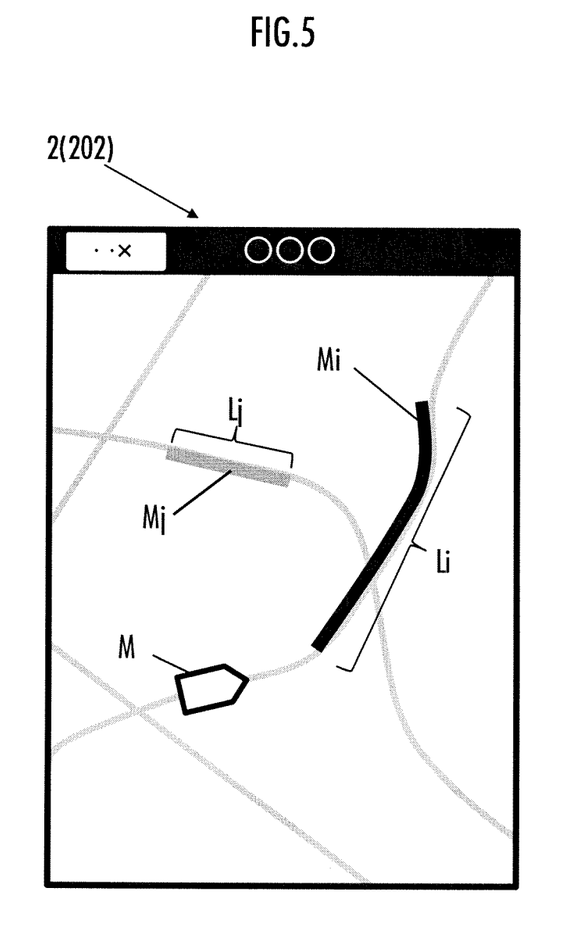
FIG. 5 is a drawing describing output mode of road traffic information in the navigation client.

The client computing element 22 in the navigation client 2 causes the output device 202 to display road traffic information thereon (STEP 24 in FIG. 2), which displays a solid line mark Mi which differs in color (high or low in brightness) according to variation in the total movement cost Ci along the designated link Li on the peripheral map around the present position in the navigation client 2, as illustrated in FIG. 5. A solid line mark Mj which differs in color according to variation in the movement cost Cj is displayed along the designated link Lj on the peripheral map. The navigation client 2 is displayed on this map as the mark M.

In case where the road traffic information is the sever route information, the client computing element 22 in the navigation client 2 may calculate a client route r connecting the start point or the latest present point later than the set time of the start point and a target position based on the server route information using the client map information to output the client route r to the output device 202.

(Method for Determining Total Movement Cost Ci)

The method for determining the total movement cost Ci is described in detail below (refer to STEP 13 in FIG. 2). It is determined whether the partial movement cost Cik with high freshness exists in all the portion links Lik constituting the designated link Li (STEP 131 in FIG. 3). The freshness is defined as a variable, in which the shorter the time elapsed since the partial movement cost Cik was determined last is, the intermittently or continuously higher the variable becomes. In the present embodiment, in case where the freshness is equal to or greater than a reference value (defined by a reference time), the freshness is defined as high, and in case where the freshness is lower than the reference value, on the other hand, the freshness is defined as low.

In a partial traffic jam occurring during commuting hours, the state of the partial traffic jam changes after one hour elapsed and the partial movement cost Cik (the required movement time in the partial link Lik) probably increases or decreases. After two hours elapsed, the partial traffic jam sometimes occurs even if no traffic jam occurs at the beginning, or the partial traffic jam sometimes disappears even if traffic jam occurs at the beginning.

For this reason, if it has taken an hour or less since the partial movement cost Cik was determined last, the reliability of the partial movement cost Cik is estimated as relatively high. On the other hand, if it has taken two hours or more since the partial movement cost Cik was determined last, the reliability of the partial movement cost Cik is estimated as relatively low.

For this reason, in case where the total movement cost Ci of the designated link Li (the required movement time at the designated link Li, for example) is determined every 15 minutes, for example, it is preferable that the partial movement cost Cik determined in two hours or less since the present time is determined as being of high freshness. It is more preferable that the partial movement cost Cik determined in one hour or less since the present time is determined as being of high freshness.

Figure 3:
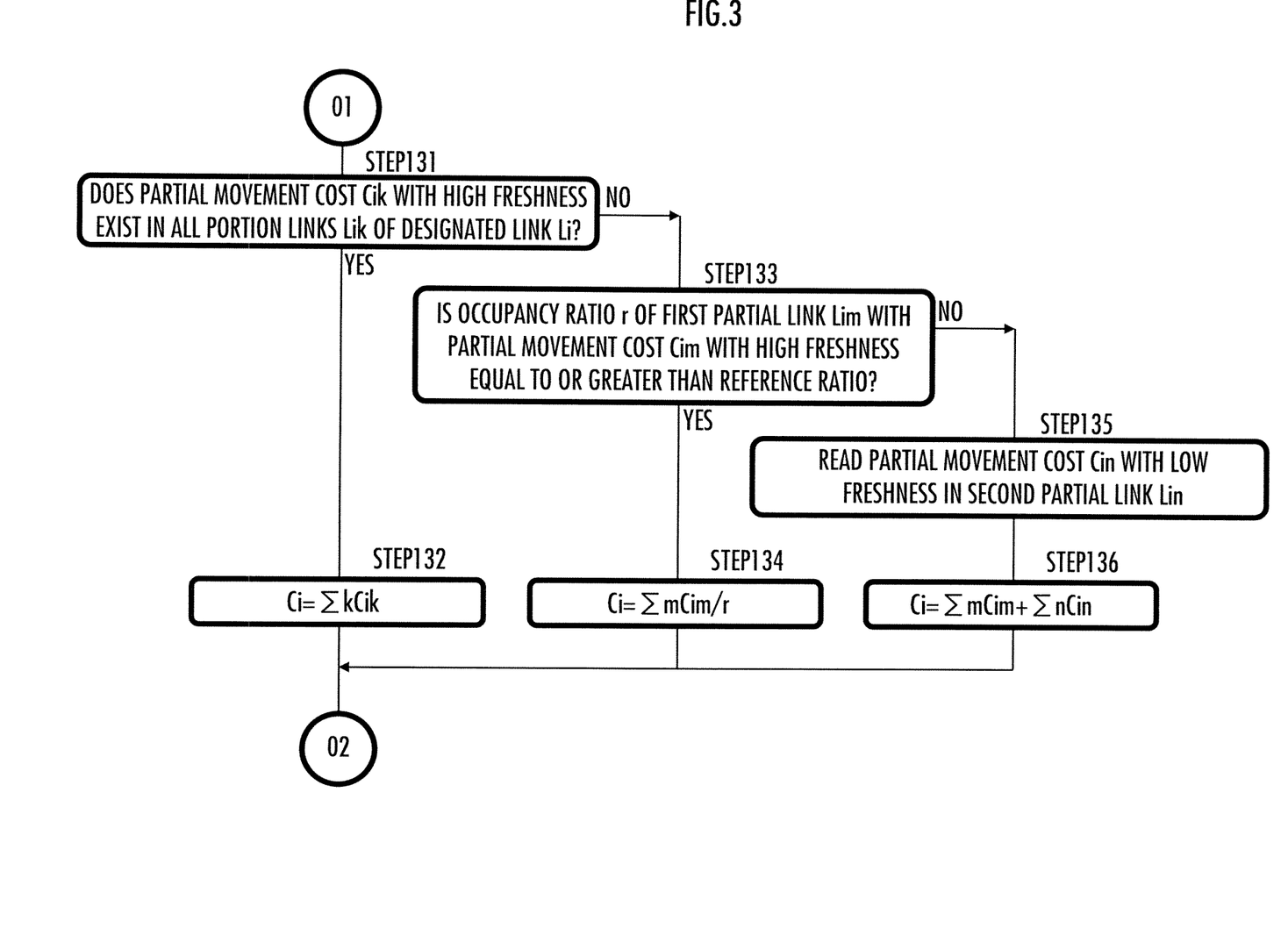
FIG. 3 is a drawing describing a method of determining total movement cost.

If the determination result is positive (YES, STEP 131 in FIG. 3), a total value $\Sigma_k Cik$ of the partial movement cost Cik in all partial links Lik constituting the designated link Li is determined as the total movement cost Ci (STEP 132 in FIG. 3).

If the determination result is negative (NO, STEP 131 in FIG. 3), it is determined whether an occupancy ratio r of a first partial link Lim (m is any integer of 1 to K) in the designated link Li is equal to or greater than a reference ratio (STEP 133 in FIG. 3). The first partial link Lim is a partial link with the partial movement cost Cim with high freshness. For example, a ratio of the total distance of the first partial link Lim to the distance of the designated link Li is defined as an occupancy ratio r. Alternatively, a ratio of the number of the first partial links Lim to the number of the partial links constituting the designated link Li may be defined as the occupancy ratio r. A reference ratio is set to a value of 0.60 or more, preferably to 0.80 or more, for example, from the viewpoint that the sufficient number of the first partial links Lim is required to grasp a traffic situation in the designated link Li. If the determination result is positive (YES, STEP 133 in FIG. 3), the quotient that the total value $\Sigma_m Cim$ of the partial movement cost Cim in the first partial link Lim is divided by the occupancy ratio r is determined as the total movement cost Ci (STEP 134 in FIG. 3).

If the determination result is negative (NO, STEP 133 in FIG. 3), the partial movement cost Cin in the second partial link Lin (n is any integer that does not correspond to m among 1 to K) is read from the server storage device 10 (STEP 135 in FIG. 3). The second partial link Lin is a partial link with the partial movement cost Cin with low freshness. For example, in STEP 135 in FIG. 3, it is preferable that a statistic in the second partial link Lin at the past same time zone and a statistic in the same day of the week at the same time zone are used as the partial movement cost Cin in the second partial link Lin.

The sum of the total value $\Sigma_m$Cim of the partial movement cost Cim in the first partial link Lim and the total value $\Sigma_n$Cin of the partial movement cost Cin in the second partial link Lin is determined as the total movement cost Ci (STEP 136 in FIG. 3).

(Operational Effects)

According to the navigation system providing the above functions and the navigation server 1 constituting the navigation system, the partial movement cost Cik being each of movement costs in a plurality of the partial links Lik constituting the designated link Li is used to determine the total movement cost Ci in the designated link Li (refer to STEP 13 in FIG. 2, STEPS 131 to 136 in FIG. 3, and FIG. 4). The higher the occupancy ratio r of the first partial link Lim among a series of the partial links Lik, the more preferentially the partial movement cost Cim in the first partial link Lim is used than the partial movement cost Cin in the second partial link Cin to determine the total movement cost Ci of the designated link Li (refer to STEP 133 to YES and STEP 134 in FIG. 3). In particular, only the partial movement cost Cim in the first partial link Lim is used to determine the total movement cost Ci of the designated link Li.

The partial movement cost Cim with low freshness is prevented from being excessively reflected in the total movement cost Ci. The partial movement cost Cin with comparatively low freshness in the second partial link Lin is not used, which improves the reliability of the total movement cost Ci in the designated link Li.

(Other Embodiments of the Present Invention)

A weighted sum of the total value $\Sigma_m$Cim of the partial movement cost Cim in the first partial link Lim and the partial movement cost Cin in the second partial link Lin may be determined as the total movement cost Ci in the designated link Li. A weighted coefficient of the total value $\Sigma_m$Cim of the partial movement cost Cim in the first partial link Lim may be set such that the higher the occupancy ratio r is, the greater the weighted coefficient will be.

If an inflow point from an inflow link is included in the designated link Li and the freshness of the partial movement cost in partial links on upstream and downstream sides at inflow points in the designated link has a deviation exceeding a threshold, the second server computing element 12 may decrease the deviation of a preferential degree of the partial movement cost in the partial link on each of the upstream and downstream sides at the inflow points. Instead of this or in addition to this, if an outflow point into an outflow link is included in the designated link Li and the freshness of the partial movement cost in partial links on upstream and downstream sides at outflow points in the designated link has a deviation exceeding the threshold, the second server computing element 12 may decrease the deviation of a preferential degree of the partial movement cost in the partial link on each of the upstream and downstream sides at the outflow points.

The server storage device 10 stores a reference movement cost Bj generated separately from the total movement cost Cj based on the probe information in each link Lj and the second server computing element 12 may determine the total movement cost Ci in the designated link Li by using a reference movement cost Bi in addition to the partial movement cost Cik. The road traffic information center (not illustrated) collects traffic state of the moving body detected by appliances provided on roads, for example, and the reference movement cost Bj may be determined based on the traffic state. For example, $\Sigma_m$Cim+(1−r)×Bi using the occupancy ratio r of the first partial link Lim in the designated link Li may be determined as the total movement cost Ci.

If there is the second partial link Lin having the partial movement cost Cin which is lower in freshness than the second reference value (lower than the above reference value), as stated above, the total movement cost Ci may be determined by using the reference movement cost Bi in the designated link Li instead of the partial movement cost Cin in the second partial link Lin. For example, in the second partial link Lin, $\Sigma_m$Cim+(1−r')×$\Sigma_n$Cin+r'×Bi using the occupancy ratio r' of the second partial link having the partial movement cost Cin which is lower in freshness than the second reference value may be determined as the total movement cost Ci.

What is claimed is:

1. A navigation server comprises:
at least one processor; and
at least one memory including computer program code,
wherein the at least one memory and the computer program code are configured to, with the at least one processor, cause the navigation server to:
recognize probe information including time series of positions of each of a plurality of navigation clients based on communication with each of the plurality of navigation clients serving as a mobile station and determine, as a partial movement cost, a movement cost in each of a series of partial links constituting one of or respective designated links among a plurality of links constituting a road network;
determine a total movement cost of the designated link composed of the series partial links by preferentially using the partial movement cost in the partial link with high freshness rather than the partial movement cost in the partial link with low freshness, the freshness being defined based on time elapsed since the first server computing element determined a last partial movement cost among the series of partial links, and store the total movement cost in the at least one memory; and
determine whether an occupancy ratio of a first partial link is equal to or greater than a reference ratio,
wherein when the occupancy ratio of the first partial link with partial movement cost with high freshness is equal to or more than the reference ratio among the series partial links, the navigation server uses the partial movement cost in the first partial link instead of the partial movement cost in a second partial link, having freshness less than the reference value, to determine the total movement cost of the designated link composed of the series of the partial links, and
wherein when the occupancy ratio of the first partial link with partial movement cost with high freshness is less than the reference ratio among the series of partial links, the navigation server reads the partial movement cost in the second partial link with low freshness and determines the total movement cost of the designated link by a sum of a total value of the partial movement cost in the first partial link and a total value of the partial movement cost in the second partial link.

2. The navigation server according to claim 1, wherein, if the occupancy ratio of the first partial link in the series partial links is equal to or greater than a reference ratio, the at least one memory and the computer program code are configured to, with the at least one processor, cause the navigation server to determine the total movement cost of the designated link by using only the partial movement cost in the first partial link.

3. The navigation server according to claim 1, wherein, in a case of the designated links including at least one of an inflow point from an inflow link and an outflow point into an outflow link, the freshness of the partial movement cost in the partial links on each of an upstream side and a downstream side of the inflow point or the outflow point has a deviation equal to or greater than a threshold, the at least one memory and the computer program code are configured to, with the at least one processor, cause the navigation server to decrease the deviation of a preferential degree of the partial movement cost in the partial link on each of the upstream side and the downstream side of the inflow point or the outflow point.

4. The navigation server according to claim 1, wherein
the at least one memory stores server map information in which a road network is represented by the plurality of links, and
the at least one memory and the computer program code are configured to, with the at least one processor, further cause the navigation server to
use the server map information to perform map matching on a position of the navigation client included in the prove information to identify the designated link where the navigation client has moved, and
determine the partial movement cost in the designated link using the probe information.

5. The navigation server according to claim 1, wherein
the at least one memory stores a reference movement cost generated separately from the total movement cost based on the probe information in each of the plurality of links, and
the at least one memory and the computer program code are configured to, with the at least one processor, further cause the navigation server to determine the total movement cost in the designated link using not only the partial movement cost in at least one of partial links among the series of partial links but also the reference movement cost in the designated link composed of the series of partial links.

6. The navigation server according to claim 1, wherein the freshness is defined as a variable which becomes intermittently or continuously higher as the time elapsed since the determination of the last partial movement cost is shorter.

7. A navigation system composed of a navigation server and a plurality of navigation clients serving as a mobile station, wherein the navigation server comprises:
at least one processor; and
at least one memory including computer program code,
wherein the at least one memory and the computer program code are configured to, with the at least one processor, cause the navigation server to:
recognize probe information including time series of positions of each of the plurality of navigation clients based on communication with each of a plurality of navigation clients serving as a mobile station and determine, as a partial movement cost, a movement cost in each of a series of partial links constituting one of or respective designated links among a plurality of links constituting a road network;
determine a total movement cost of the designated link composed of the series partial links by preferentially using the partial movement cost in the partial link with high freshness rather than the partial movement cost in the partial link with low freshness, the freshness being defined based on time elapsed since the first server computing element determined a last partial movement cost among the series of partial links, and store the total movement cost in the at least one memory; and
determine whether an occupancy ratio of a first partial link is equal to or greater than a reference ratio,
wherein when the occupancy ratio of the first partial link with partial movement cost with high freshness is equal to or more than the reference ratio among the series partial links, the navigation server uses the partial movement cost in the first partial link instead of the partial movement cost in a second partial link, having freshness less than the reference value, to determine the total movement cost of the designated link composed of the series of the partial links, and
wherein when the occupancy ratio of the first partial link with partial movement cost with high freshness is less than the reference ratio among the series of partial links, the navigation server reads the partial movement cost in the second partial link with low freshness and determines the total movement cost of the designated link by a sum of a total value of the partial movement cost in the first partial link and a total value of the partial movement cost in the second partial link.

8. The navigation server according to claim 1, wherein a weighting factor of the first partial link is determined according to the freshness of the partial moving cost determined within a predetermined time from a present time point.

* * * * *